(12) United States Patent
Otani et al.

(10) Patent No.: US 8,294,769 B2
(45) Date of Patent: Oct. 23, 2012

(54) SURVEYING DEVICE AND AUTOMATIC TRACKING METHOD

(75) Inventors: Hitoshi Otani, Itabashi-ku (JP); Kaoru Kumagai, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 589 days.

(21) Appl. No.: 12/456,822

(22) Filed: Jun. 22, 2009

(65) Prior Publication Data

US 2010/0007739 A1 Jan. 14, 2010

(30) Foreign Application Priority Data

Jul. 5, 2008 (JP) ................................. 2008-176392
Mar. 30, 2009 (JP) ................................. 2009-081140

(51) Int. Cl.
*H04N 7/18* (2006.01)
*G06K 9/00* (2006.01)

(52) U.S. Cl. ...................... 348/159; 382/103
(58) Field of Classification Search .............. 348/159, 348/240.99, 143, 135, 169, 137, 138, 139, 348/140, 141, 142, 211, 212, 213; 382/313, 382/103, 232

See application file for complete search history.

(56) References Cited

U.S. PATENT DOCUMENTS

| | | | | |
|---|---|---|---|---|
| 5,780,839 A * | 7/1998 | Livingston | ................. | 250/203.2 |
| 5,973,309 A | 10/1999 | Livingston | | |
| 6,137,569 A | 10/2000 | Sasaki et al. | .................. | 356/153 |
| 6,153,871 A * | 11/2000 | Livingston | ................. | 250/203.2 |
| 6,198,501 B1 * | 3/2001 | Nemiroff et al. | ............. | 348/135 |
| 2002/0024599 A1 | 2/2002 | Fukuhara et al. | | |
| 2004/0163266 A1 | 8/2004 | Kaneko | ............................ | 33/290 |
| 2005/0271248 A1 * | 12/2005 | Teku et al. | ..................... | 382/103 |
| 2006/0028548 A1 * | 2/2006 | Salivar et al. | ................. | 348/143 |
| 2007/0058717 A1 * | 3/2007 | Chosak et al. | ........... | 375/240.08 |
| 2008/0094480 A1 | 4/2008 | Swarr et al. | | |
| 2009/0028386 A1 | 1/2009 | Michimoto et al. | | |
| 2009/0080701 A1 | 3/2009 | Meuter et al. | | |
| 2009/0262196 A1 * | 10/2009 | Salivar et al. | ................. | 348/159 |
| 2010/0121540 A1 * | 5/2010 | Kumagai et al. | ................. | 701/50 |
| 2010/0165112 A1 * | 7/2010 | Scanlon et al. | ............... | 348/169 |
| 2010/0245587 A1 | 9/2010 | Otani et al. | | |
| 2010/0265331 A1 * | 10/2010 | Tanaka | .......................... | 348/159 |
| 2010/0321504 A1 | 12/2010 | Miyamaki et al. | | |

FOREIGN PATENT DOCUMENTS

EP 1 126 414 8/2001

(Continued)

OTHER PUBLICATIONS

European communication dated Sep. 29, 2009.

(Continued)

*Primary Examiner* — Behrooz Senfi
(74) *Attorney, Agent, or Firm* — Nields, Lemack & Frame, LLC (57) ABSTRACT

A surveying device, comprising a first image pickup unit for projecting a laser beam and for receiving a reflection light from a target, a second image pickup unit for acquiring an image including the target, drive units for shifting collimating directions of the image pickup units, an image processing unit for processing images taken by the image pickup units, and a control arithmetic unit for controlling the drive units so that the image pickup units are directed toward the target is disclosed. The image processing of the image by the first image pickup unit is a light spot detection processing. The image processing of the image by the second image pickup unit is an image matching with a template image. The control arithmetic unit controls the drive units so that the target is tracked based on the result of the light spot detection processing or the image matching.

15 Claims, 6 Drawing Sheets

FOREIGN PATENT DOCUMENTS

| | | |
|---|---|---|
| EP | 1486969 A2 | 12/2004 |
| EP | 2141450 A1 | 1/2010 |
| JP | 7-198383 | 8/1995 |
| JP | 11-271451 A | 10/1999 |
| JP | 2000-346645 | 12/2000 |
| JP | 2002-131054 | 5/2002 |
| JP | 2004-132914 | 4/2004 |
| JP | 2004-170354 | 6/2004 |

OTHER PUBLICATIONS

European Communication dated Aug. 26, 2010 in co-pending European Patent Application No. EP 10156948.1.

European Communication mailed Nov. 8, 2011 in co-pending European Patent Application No. EP 10156948.1.

International Multimedia Conference-First ACM SIGMM International Workshop on Video Surveillance, Berkeley, CA, Nov. 2-8, 2003, IWVS '03, Nov. 7, 2003, pp. 113-120, XP 002538254, "A Master-Slave System to Acquire Biometric Imagery of Humans at a Distance", Zhou, et al.

Proceedings of the 2006 IEEE International Conference on Robotics and Biomimetics, Dec. 17-20, 2006, Kunming, China, XP 031069007, pp. 1488-1493, "Target Tracking in Colored Image Sequence Using Weighted Color Histogram Based Particle Filter", Zhuang, et al.

Office Action mailed May 17, 2012 in co-pending U.S. Appl. No. 12/661,573.

\* cited by examiner

SURVEYING DEVICE AND AUTOMATIC TRACKING METHOD

BACKGROUND OF THE INVENTION

The present invention relates to a surveying device. In particular, the invention relates to a surveying device with a tracking function and also relates to an automatic tracking method by using the surveying device.

In the past, a surveying device with a tracking function has been known, which can measure a distance, a horizontal angle and a vertical angle. Such type of surveying device is so designed that an object reflector (target) such as a corner cube is collimated through a collimating telescope provided on the surveying device, a tracking light is projected from the collimating telescope, and a reflection light from the target is received and detected. When the target moves, a deviation between a detecting position of the reflection light from the target and a center of collimation is identified, and the collimating direction is adjusted based on the deviation, and the target is automatically tracked.

Normally, in this type of surveying device with the tracking function, no operator is assigned on the surveying device side. The target is supported by a surveying operator, or the target is mounted on a construction machine such as a bulldozer. Corresponding to the progress of the surveying operation, the target is moved, and the surveying device tracks the moving target.

However, in case the moving speed of the target exceeds the following speed of the surveying device and the target may be deviated from visual field of the collimating telescope, or in case a reflection light from a reflecting object such as window glass may enter the surveying device, or in case targets pass each other and reflection lights from two or more targets may enter the surveying device, or in case an object such as an automobile may pass in front of the target and may intercept the reflection light, the survey device may miss the target or may erroneously recognize the target and may not be able to track the target, and automatic tracking may be interrupted.

This is because the collimating telescope generally in use has a field angle (angle of visual field) as small as about 1° and a detection range to detect the reflection for automatic tracking is small.

When tracking operation is interrupted, the surveying device starts an operation to search the target. In the searching operation, the collimating telescope is rotated within a predetermined range in vertical direction and in left-to-right direction for scanning while projecting a tracking light, and the target is detected.

The field angle (angle of visual field) of the collimating telescope is as small as about 1°. In order to re-detect the target, it is necessary to have finer pitch of scanning and to increase the number of scanning operations. Therefore, when the tracking operation is interrupted, relatively long time is required until the target can be detected again and the tracking can be started. Further, in the working conditions where the interruption of an optical path caused by an obstacle may occur frequently, a problem may arise that a working efficiency of the measurement is extremely decreased.

Also, in case the target is extensively deviated from the visual field of the telescope, the target may not be detected again, and the surveying operation itself may be stopped.

The surveying device with the tracking function is disclosed in each of JP-A-7-198383, JP-A-2000-346645, and JP-A-2004-170354.

SUMMARY OF THE INVENTION

It is an object of the present invention to provide a surveying device with a tracking function, by which it is possible to re-detect an object reflector quickly when the object reflector is missed in sight, to reduce the time until a restoration of the automatic tracking, and to improve the efficiency of the measuring operation.

To attain the above object, the present invention provides a surveying device, which comprises a first image pickup unit for projecting a laser beam and for receiving a reflection light from a target supported by a support member, a second image pickup unit for acquiring an image including the target and with a field angle wider than a field angle of the first image pickup unit, drive units for shifting collimating directions of the first image pickup unit and the second image pickup unit in a horizontal direction and in a vertical direction respectively, an image processing unit for processing images taken by the first image pickup unit and by the second image pickup unit, and a control arithmetic unit for controlling the drive units so that the first image pickup unit and the second image pickup unit are directed toward the target based on the image processing of the image taken by the first image pickup unit and on the image processing of the image taken by the second image pickup unit, wherein the image processing of the image by the first image pickup unit is a light spot detection processing to obtain a light spot from the target, wherein the image processing of the image by the second image pickup unit is an image matching with a template image as set up according to the image of the support member, and wherein the control arithmetic unit controls the drive units so that a tracking of the target is performed based on either the result of the light spot detection processing or the result of the image matching.

Also, the present invention provides the surveying device as described above, comprising a first image pickup unit for receiving a light from a light source, which is a target mounted on a support member, a second image pickup unit for acquiring an image including the target and with a field angle wider than a field angle of the first image pickup unit, drive units for shifting collimating directions of the first image pickup unit and the second image pickup unit in a horizontal direction and in a vertical direction respectively, an image processing unit for performing image processing of images picked up by the first image pickup unit and by the second image pickup unit, and a control arithmetic unit for controlling the drive units so that the first image pickup unit and the second image pickup unit are directed toward the target based on the image processing of the image taken by the first image pickup unit and on the image processing of the image taken by the second image pickup unit, wherein the image processing of the image by the first image pickup unit is a light spot detection processing to obtain a light spot from the target, wherein the image processing of the image by the second image pickup unit is an image matching with a template image as set up according to the image of the support member, and wherein the control arithmetic unit controls the drive unit so that a tracking of the target is performed based on either the result of one of the light spot detection processing or the result of the image matching.

Further, the present invention provides the surveying device as described above, wherein the control arithmetic unit controls a tracking based on a result of the light spot detection processing in case where the result of the light spot detection processing is obtained of the results of the light spot detection processing and the image matching. Also, the present invention provides the surveying device as described above, wherein the control arithmetic unit controls a tracking based on a result of the image matching in case where the result of the light spot detection processing is not obtained and the result of the image matching is obtained of the results of the light spot detection processing and the image matching. Further, the present invention provides the surveying device as described above, wherein the template image is a part of the object image as set up so that at least two or more characteristic points are included, wherein the object image of the support member is extracted from the image acquired by the second image pickup unit and further, the characteristic points are extracted from the object image. Also, the present invention provides the surveying device as described above, wherein the template image is updated in response to the change of the measured distance. Further, the present invention provides the surveying device as described above, wherein in case where both results are not obtained from the light spot detection processing and from the image matching, the control arithmetic unit controls so that the drive units are stopped, a still image is acquired by the second image pickup unit, and an image matching is performed between the still image and the template image on the total range of the still image, and the control arithmetic unit obtains a position of the target from the still image based on the result of the image matching. Also, the present invention provides the surveying device as described above, wherein the control arithmetic unit judges whether a light spot from the target can be obtained from candidate points in case where a plurality of candidates points are detected by the image matching, and judges whether a position where the light spot is obtained as the position of the target. Further, the present invention provides the surveying device as described above, wherein the second image pickup unit can pickup an image of low magnification and an image of high magnification, and low magnification image pickup and high magnification image pickup can be selected, depending on the measured distance. Also, the present invention provides the surveying device as described above, wherein the control arithmetic unit performs a tracking based on the image matching, detects the light spot of the target based on the image matching, and restores to the tracking operation based on the detection of a light spot.

Further, the present invention provides an automatic tracking method, comprising a light spot detecting step for projecting a laser beam and for detecting a light spot from a target, a step for taking an image of a target and an image of a support member to support the target, and an image matching step for detecting the support member by image matching based on the picked-up image, wherein the light spot detecting step, a step for taking an image of a target and an image of a support member to support the target, and an image matching step are carried out in parallel, and while a tracking is performed based on the result of detection of the light spot detecting step, a tracking operation is performed based on the image matching step in case where sufficient result is not obtained by detection in the light spot detecting step. Also, the present invention provides an automatic tracking method as described above, while a tracking is performed based on the image matching step, the target is detected according to the image matching, and it is restored the tracking operation based on light spot detection. Further, the present invention provides an automatic tracking method as described above, wherein the light spot detecting step projects a laser beam and detects a reflection light from the target. Also, the present invention provides an automatic tracking method as described above, wherein, in the light spot detecting step, the target is a light source, and a light emitted from the light source is detected.

The present invention provides a surveying device, which comprises a first image pickup unit for projecting a laser beam and for receiving a reflection light from a target supported by a support member, a second image pickup unit for acquiring an image including the target and with a field angle wider than a field angle of the first image pickup unit, drive units for shifting collimating directions of the first image pickup unit and the second image pickup unit in a horizontal direction and in a vertical direction respectively, an image processing unit for processing images taken by the first image pickup unit and by the second image pickup unit, and a control arithmetic unit for controlling the drive units so that the first image pickup unit and the second image pickup unit are directed toward the target based on the image processing of the image taken by the first image pickup unit and on the image processing of the image taken by the second image pickup unit, wherein the image processing of the image by the first image pickup unit is a light spot detection processing to obtain a light spot from the target, wherein the image processing of the image by the second image pickup unit is an image matching with a template image as set up according to the image of the support member, and wherein the control arithmetic unit controls the drive units so that a tracking of the target is performed based on either the result of the light spot detection processing or the result of the image matching. As a result, even when it is impossible to perform the tracking operation according to a light spot from the target, the tracking is not interrupted, and it is possible to avoid troublesome procedure such as re-setting of the tracking.

Also, the present invention provides the surveying device as described above, comprising a first image pickup unit for receiving a light from a light source, which is a target mounted on a support member, a second image pickup unit for acquiring an image including the target and with a field angle wider than a field angle of the first image pickup unit, drive units for shifting collimating directions of the first image pickup unit and the second image pickup unit in a horizontal direction and in a vertical direction respectively, an image processing unit for performing image processing of images picked up by the first image pickup unit and by the second image pickup unit, and a control arithmetic unit for controlling the drive units so that the first image pickup unit and the second image pickup unit are directed toward the target based on the image processing of the image taken by the first image pickup unit and on the image processing of the image taken by the second image pickup unit, wherein the image processing of the image by the first image pickup unit is a light spot detection processing to obtain a light spot from the target, wherein the image processing of the image by the second image pickup unit is an image matching with a template image as set up according to the image of the support member, and wherein the control arithmetic unit controls the drive unit so that a tracking of the target is performed based on either the result of one of the light spot detection processing or the result of the image matching. As a result, even when it is impossible to perform the tracking operation according to a light spot from the target, the tracking is not interrupted, and it is possible to avoid troublesome procedure such as re-setting of the tracking.

Further, the present invention provides the surveying device as described above, wherein the control arithmetic unit controls a tracking based on a result of the light spot detection processing in case where the result of the light spot detection processing is obtained of the results of the light spot detection processing and the image matching can be obtained. Also, the present invention provides the surveying device as described above, wherein the control arithmetic unit controls a tracking based on a result of the image matching in case where the result of the light spot detection processing is not obtained and the result of the image matching is obtained of the results of the light spot detection processing and the image matching. As a result, even when it is impossible to perform the tracking operation according to a light spot from the target, the tracking is not interrupted, and it is possible to avoid troublesome procedure such as re-setting of the tracking.

Further, the present invention provides the surveying device as described above, wherein the template image is a part of the object image as set up so that at least two or more characteristic points are included, wherein the object image of the support member is extracted from the image acquired by the second image pickup unit and further, characteristic points are extracted from the object image. As a result, it is possible to reduce a range for matching, and to decrease the burden for a data processing and to execute the operation at real time. Also, the accuracy of the matching processing can be improved because at least two or more characteristic points are included.

Also, the present invention provides the surveying device as described above, wherein the template image is updated in response to the change of the measured distance. As a result, it is possible to carry out the image matching with high accuracy according to the change of the measuring conditions.

Further, the present invention provides the surveying device as described above, wherein, in case both results are not obtained from the light spot detection processing and from the image matching, the control arithmetic unit controls so that the drive units are stopped, a still image is acquired by the second image pickup unit, and an image matching is performed between the still image and the template image on the total range of the still image, and the control arithmetic unit obtains a position of the target from the still image based on the result of the image matching. As a result, even when it is not possible to perform the tracking operation, the target can be searched in wide range, and it is possible to restore to the quick tracking operation.

Also, the present invention provides the surveying device as described above, wherein the control arithmetic unit judges whether a light spot from the target can be obtained from the candidate points in case where a plurality of candidates points are detected by the image matching, and judges whether a position where the light spot is obtained as the position of the target. As a result, it is possible to improve an efficiency of the target detection.

Further, the present invention provides the surveying device as described above, wherein the second image pickup unit can pickup an image of low magnification and an image of high magnification, and low magnification image pickup and high magnification image pickup can be selected, depending on the measured distance. As a result, an adequate object image can be acquired regardless of whether it is in shorter distance or in longer distance, and an image tracking can be carried out under a proper conditions.

Also, the present invention provides the surveying device as described above, wherein the control arithmetic unit performs a tracking based on the image matching, detects the light spot of the target based on the image matching, and restores to the tracking operation based on the detection of a light spot. As a result, the range to search the target may be small, and it is possible to quickly restore to the tracking operation.

Further, the present invention provides an automatic tracking method as described above, comprising a light spot detecting step for projecting a laser beam and for detecting a light spot from a target, a step for taking an image of a target and an image of a support member to support the target, and an image matching step for detecting the support member by image matching based on the picked-up image, wherein the light spot detecting step, a step for taking an image of a target and an image of a support member to support the target, and an image matching step are carried out in parallel, and while a tracking is performed based on the result of detection of the light spot detecting step, a tracking operation is performed based on the image matching step in case where sufficient result is not obtained by detection in the light spot detecting process. As a result, even when it is impossible to perform the tracking operation according to a light spot from the target, the tracking is not interrupted, and it is possible to avoid troublesome procedure such as re-setting of the tracking.

Also, the present invention provides an automatic tracking method as described above, wherein while a tracking is performed based on the image matching step, the target is detected according to the image matching, and it is restored the tracking operation based on light spot detection. As a result, it is possible to carry out operation with high efficiency without interrupting the surveying operation based on the target.

DETAILED DESCRIPTION OF THE PREFERRED EMBODIMENT

Referring to the drawings, descriptions will be given below on an embodiment of the present invention.

Figure 1:
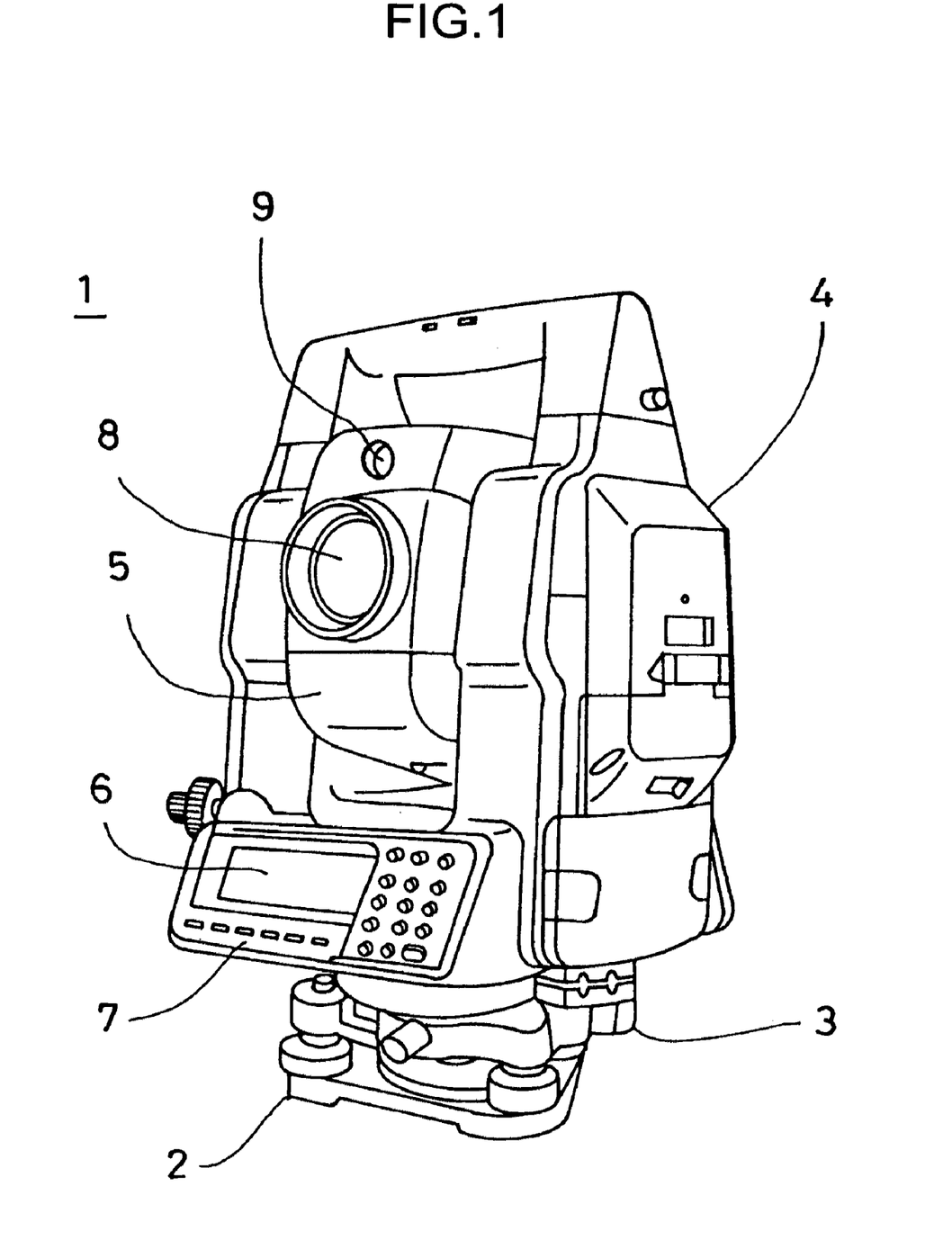
FIG. 1 is a perspective view of an example of a surveying device, in which the present invention is carried out.
Figure 2:
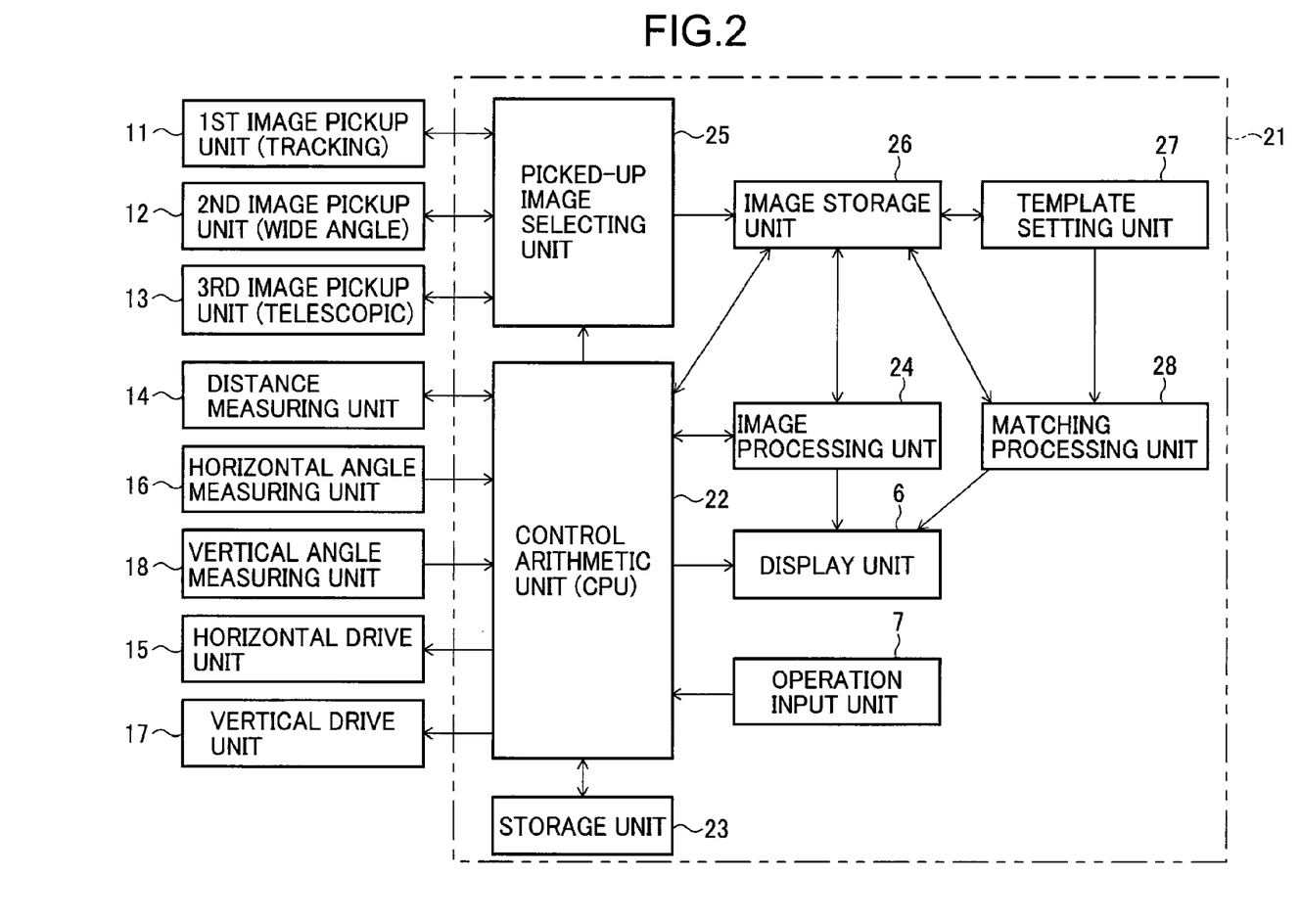
FIG. 2 is a schematical block diagram of a surveying device according to an embodiment of the present invention.

FIG. 1 and FIG. 2 each represents a surveying device 1, in which the present invention is carried out. The surveying device 1 in use is a total station, for instance. A pulsed laser beam is projected toward a measuring point. By receiving and detecting a pulsed reflection light from the measuring point, a distance to the measuring point is determined for each pulse. The results of the distance measurements are averaged, and the distance is measured with high accuracy.

As shown in FIG. 1, the surveying device 1 primarily comprises a leveling unit 2 installed on a tripod (not shown), a base unit 3 provided on the leveling unit 2, a frame unit 4 rotatably provided around a vertical axis on the base unit 3, and a telescope unit 5 rotatably provided around a horizontal axis on the frame unit 4.

The frame unit 4 has a display unit 6 and an operation input unit 7. The telescope unit 5 comprises a first telescope 8 for collimating an object to be measured and a first image pickup unit 11 (to be described later) and a third image pickup unit 13 (to be described later) each for acquiring an image in a collimating direction via an optical system of the first telescope 8.

The telescope unit 5 is further provided with a second telescope 9 which has lower magnification and wider field of view than the first telescope 8 and is provided with a second image pickup unit 12 (to be described later) which can acquire an image of wide angle in collimating direction or approximately in collimating direction via an optical system of the second telescope 9 and can pick up a wide-angle image.

The first telescope 8 has a field angle of 1°, for instance, and the second telescope 9 has a field angle of 15° to 30°, for instance. The first telescope 8 has an optical axis, which is different from an optical axis of the second telescope 9. A distance between these two optical axes is already known, and a deviation in the collimating direction between the second telescope 9 and the first telescope 8 can be adjusted by calculation.

The third image pickup unit 13 is used to acquire an image of an object to be measured (a target) through the first telescope 8 and can pick up an image of a range as required around the optical axis (a collimating optical axis) of the first telescope 8. The first image pickup unit 11 is provided on an optical path, which is obtained by dividing an optical path of the first telescope 8, and an image can be picked up in the equivalent range as the field angle of the first telescope 8, e.g. a range with a field angle of 1°, for instance. Based on the image acquired by the first image pickup unit 11, tracking operation is performed.

Each of the second image pickup unit 12 and the third image pickup unit 13 picks up an image of wide range including a target, and an object or a person supporting the target.

As each of the first image pickup unit 11, the second image pickup unit 12 and the third image pickup unit 13, a camera, e.g. a digital camera, is used, which outputs the picked-up image as a digital image signal. CCD, CMOS, etc., which is an aggregate of pixels, is used as a photodetection element in each of the first image pickup unit 11, the second image pickup unit 12, and the third image pickup unit 13 so that a position of the pixel received and detected can be identified and a field angle can be obtained from a position of the detected pixel. It is preferable that the image taken by each of the second image pickup unit 12 and the third image pickup unit 13 is a color image.

Now, referring to FIG. 2, description will be given on a basic arrangement of the surveying device 1.

The telescope unit 5 has a built-in distance measuring unit 14, which shares an optical system in common with the first telescope 8. The distance measuring unit 14 projects a distance measuring light, and electro-optical distance measurement is performed by receiving and detecting a reflection light from the object to be measured.

The distance measuring unit 14 can be switched over to two measurement modes: a prism measurement mode in case the object to be measured is a prism, and a non-prism measurement mode in case the object to be measured is not a prism.

A horizontal drive unit 15 for rotating the frame unit 4 in horizontal direction is provided on the frame unit 4. Also, a horizontal angle measuring unit 16 is provided, which detects a horizontal rotation angle of the frame unit 4 with respect to the base unit 3, and detects a horizontal angle in the collimating direction. On the frame unit 4, a vertical drive unit 17 is provided, which rotates the telescope unit 5 around the horizontal axis, and a vertical angle measuring unit 18 is provided, which detects a vertical angle of the telescope unit 5 and measures a vertical angle in the collimating direction.

A control device 21 is incorporated in the frame unit 4. The control device 21 controls driving of the horizontal drive unit 15 and the vertical drive unit 17, rotates the frame unit 4 and the telescope unit 5 and turns the telescope unit 5 in a direction as required. Also, the control device 21 scans over a predetermined range. Further, the control device 21 controls the switchover of the first telescope 8 and the second telescope 9 and also controls the switchover of the first image pickup unit 11, the second image pickup unit 12, and the third image pickup unit 13. Then, the control device 21 acquires an image with a magnification as required, and further controls the distance measuring unit 14 and the distance measuring unit 14 measures a distance to the predetermined measuring point.

The control device 21 comprises a control arithmetic unit 22, a storage unit 23, an image processing unit 24, a picked-up image selecting unit 25, an image storage unit 26, a template setting unit 27, a matching processing unit 28, the display unit 6, the operation input unit 7, etc.

Various types of programs stored in the storage unit 23. These programs include: a calculation program necessary for the measurement, an image processing program for performing a first image processing (to be described later), a sequence program for selecting a measuring point (a point where a reflection light from mirror is detected) from the processed image, for carrying out the distance measurement to the selected measuring point (target), and for tracking the measuring point, and a searching program for searching a target when the measurement is started and also for searching the target when the target is missed.

Further, the image processing program performs a second image processing (to be described later), extracts an object to be measured (object) from the processed image, selects a characteristic portion of the extracted images, and sets up the characteristic portion as a template. Also, the following programs are stored: a searching program for searching an object to be measured based on the template, and a program for executing the distance measurement in non-prism measurement mode when the object to be measured is recognized as an object.

The results of the measurements by the distance measuring unit 14, by the horizontal angle measuring unit 16, and by the vertical angle measuring unit 18 are inputted to the control arithmetic unit 22, and a distance, a vertical angle, and a horizontal angle are measured by the control arithmetic unit 22. The results of the measurements are stored in the storage unit 23 via the control arithmetic unit 22 and are displayed on the display unit 6.

The first image pickup unit 11, the second image pickup unit 12 and the third image pickup unit 13 are selected by the picked-up image selecting unit 25 and the images picked up by the first image pickup unit 11, the second image pickup unit 12 and the third image pickup unit 13 and selected by the picked-up image selecting unit 25 are stored in the image storage unit 26 respectively and are displayed on the display unit 6 as appropriate.

The image processing unit 24 detects a received reflection light (a light spot) from the image stored in the image storage unit 26, e.g. an image acquired at the first image pickup unit 11 (i.e. an image acquired for tracking purpose), and determines a position of the target, i.e. a horizontal angle and a vertical angle in the collimating direction of the first telescope 8, from a barycenter of the light spot (a position of pixel on the photodetection element).

The image processing unit 24 extracts an object, which is supporting the target, as an object to be measured from the images acquired by the second image pickup unit 12 and the third image pickup unit 13, and further extracts characteristic points through image processing such as edge processing on the object.

The template setting unit 27 sets up a template within the range of the object so that the template includes at least two or more characteristic points.

The matching processing unit 28 performs image matching of a template as set up by the template setting unit 27 with a moving image as picked up by the second image pickup unit 12 or the third image pickup unit 13, and performs the tracking of the image.

Next, referring to FIG. 3, description will be given below on the target searching and the tracking in the present invention. A target 31 is a prism such as a corner cube, and the target is supported by a moving object such as a bulldozer or an operator. In the following, description will be given on a case where the moving object is a bulldozer 30.

In the present embodiment, a laser tracking and an image tracking are carried out in parallel. In the laser tracking, a tracking light (a laser beam) is projected from the first telescope 8 along the same optical axis as the optical axis of the distance measuring light, and tracking is performed by receiving and detecting a laser beam reflected by the target 31. In the image tracking, tracking is performed by image matching based on the images taken by the second image pickup unit 12 and the third image pickup unit 13 via the second telescope 9.

A field angle of the first telescope 8 used in the laser tracking is as small as 1°, and the range to be taken by the first image pickup unit 11 is limited to a predetermined range around the optical axis of the first telescope 8. An angle of view of the second telescope 9 is bigger than an angle of view of the first telescope 8 and it is set to 15°. Therefore, the field angle of the image taken by the second image pickup unit 12 is 15°, and the field angle of the image taken by the third image pickup unit 13 is 1°. In the image tracking, it is determined whether the image taken by the second image pickup unit 12 is used or the image taken by the third image pickup unit 13 is used, depending on a distance to the object to be measured.

Figure 3:
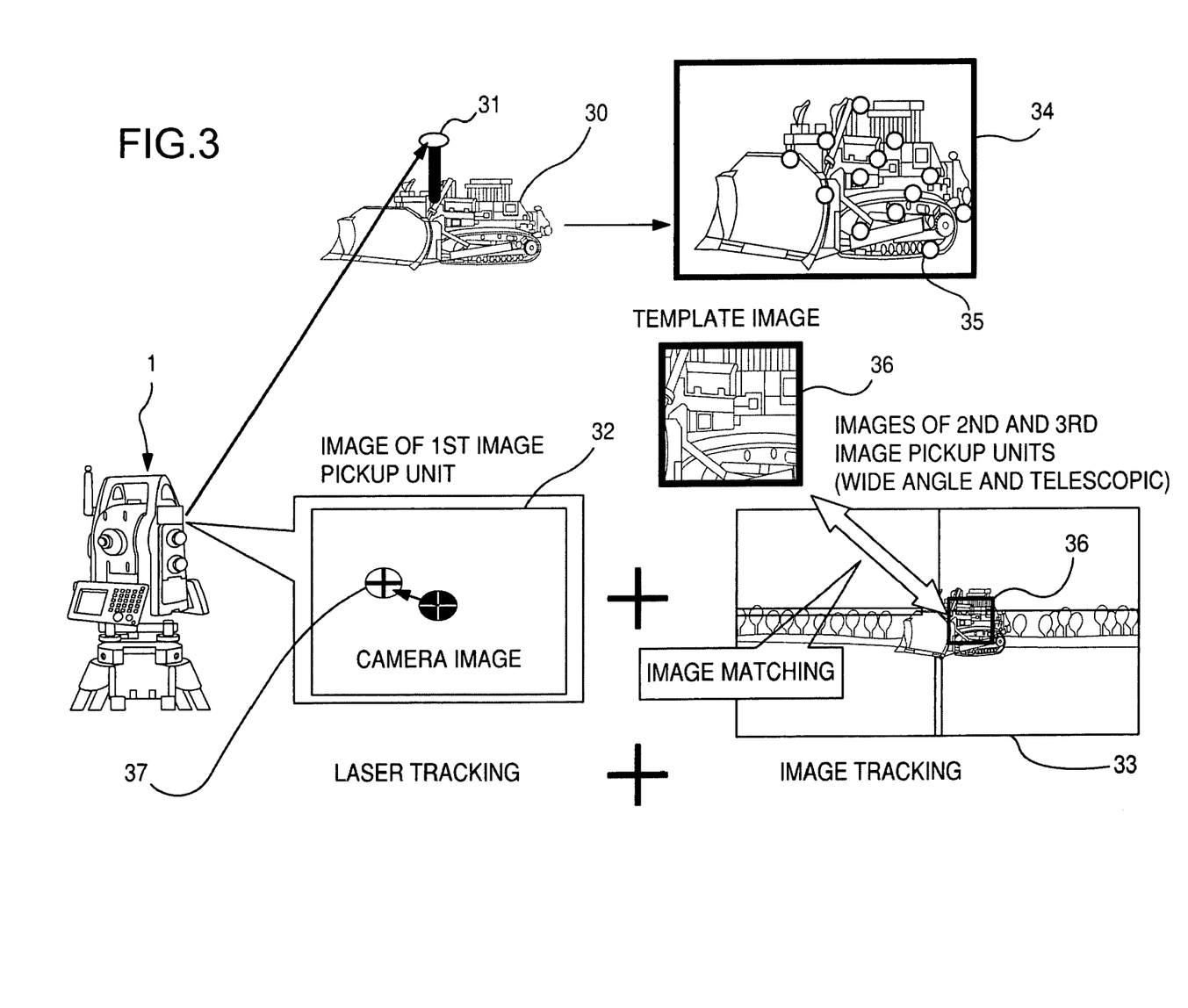
FIG. 3 shows illustrations to explain a tracking operation in the embodiment of the present invention.

In FIG. 3, reference numeral 32 denotes an image of the first image pickup unit for the laser tracking, and numeral 33 represents an image taken by the second image pickup unit and the third image pickup units. Numeral 34 denotes an object image, which is obtained by extracting the object to be measured as an object. A characteristic point 35 is extracted through image processing of the object image 34. Further, in the object image 34, a portion including many characteristic points 35 is set as a template image 36. The template image 36 is in the size of 20×20 pixels.

The laser tracking and the image tracking are carried out in parallel. Normal tracking is performed according to the result obtained by the laser tracking. In case where, in the laser tracking, it is deviated from the searching range of the laser tracking, e.g. when the light spot 37 is deviated from the range where the image can be taken by the first image pickup unit 11, i.e. deviated form the first image pickup unit image 32 and the target is missed, or in case where a plurality of light spots are detected and the laser tracking cannot be carried out, it is shifted to the image tracking by the second telescope 9 with a wide field angle.

When the image tracking is carried out, a target in the image is detected, and it is restored to the laser tracking again.

Figure 4:
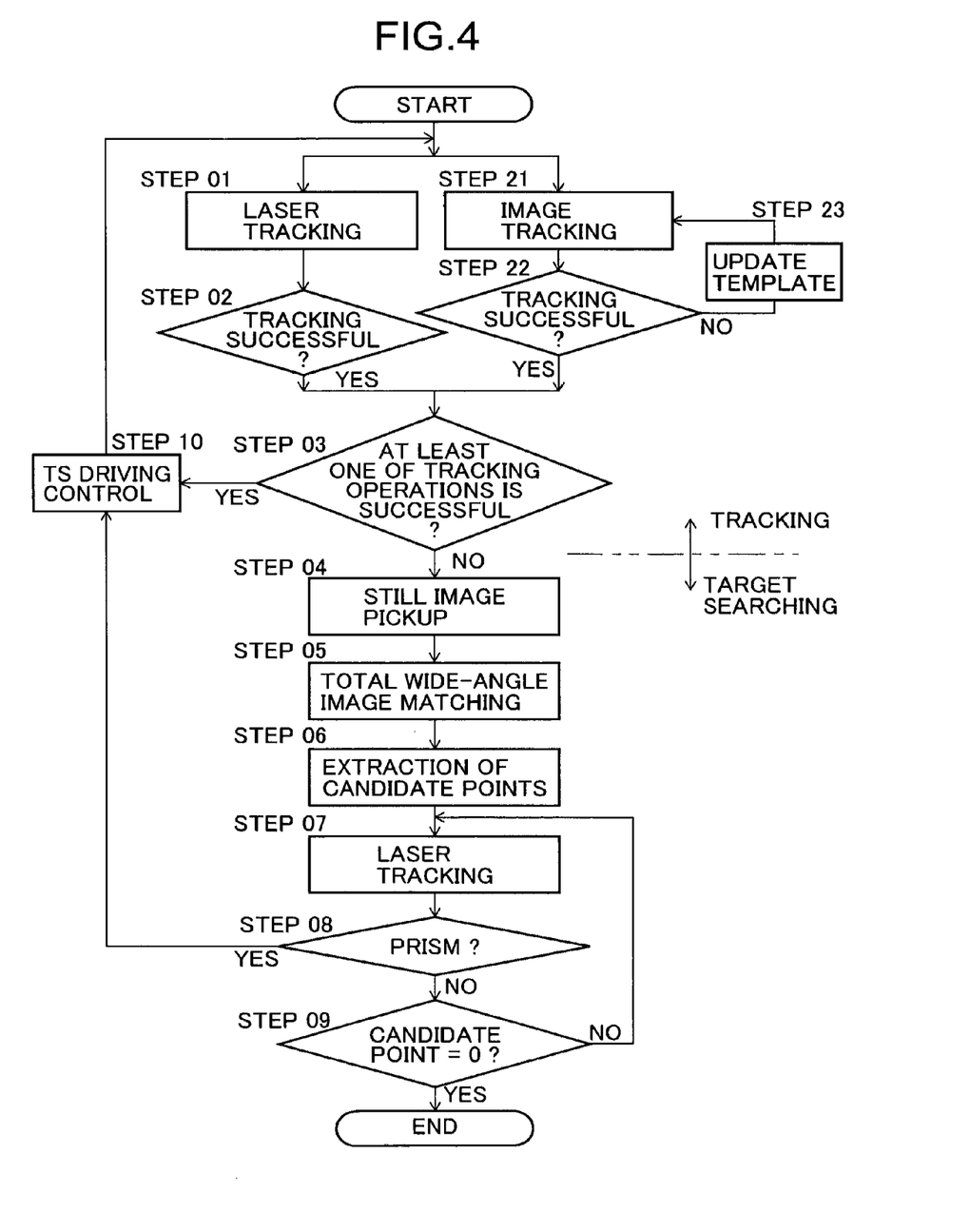
FIG. 4 is a flowchart to show an operation in the embodiment of the present invention.

FIG. 4 shows a flow of tracking operation in the present embodiment, and the laser tracking and the image tracking are carried out in parallel.

Figure 5:
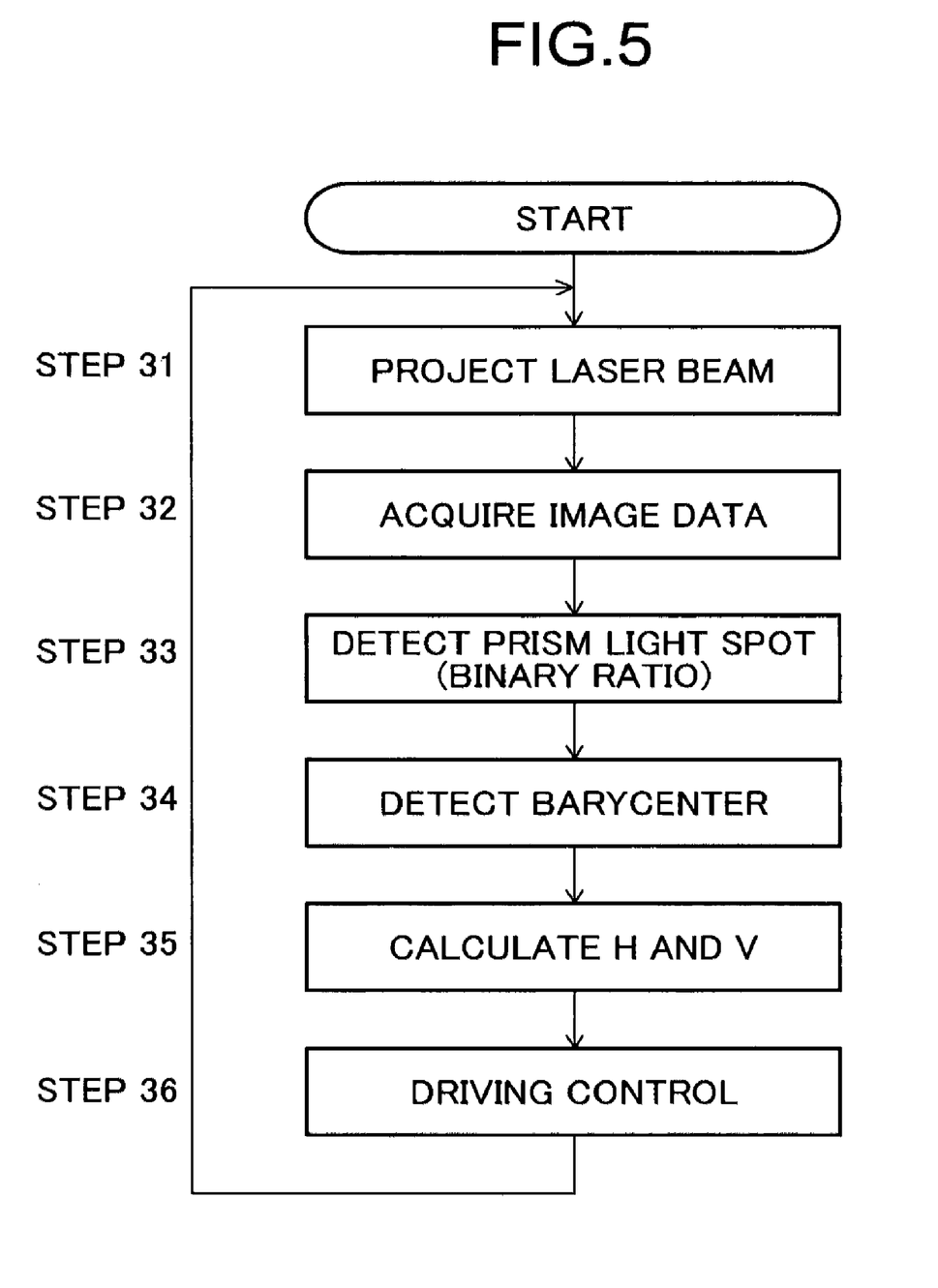
FIG. 5 is a flowchart of a laser tracking in the embodiment of the present invention.

First, referring to FIG. 5, description will be given on the laser tracking.

A laser beam is projected via the first telescope 8 (Step 31). A laser beam reflected by the target is received and detected via the first telescope 8, and an image is picked up by the first image pickup unit 11 (Step 32). The image thus acquired is processed by binary processing. The light spot of the laser beam is detected (Step 33), and a barycenter of the light spot 37 in the photodetection element in the first image pickup unit 11 is detected (Step 34).

From the position of the pixel in the photodetection element, which corresponds to the barycenter of the light spot 37, a field angle at the first image pickup unit 11 is determined. Further, from a horizontal angle and a vertical angle detected by the horizontal angle measuring unit 16 and the vertical angle measuring unit 18 respectively, a horizontal angle (H) and a vertical angle (V) of the target are calculated (Step 35). Based on the results of calculation, the driving of the horizontal drive unit 15 and the vertical drive unit 17 are controlled (Step 36). The distance is measured at the same time as the laser tracking.

Figure 6:
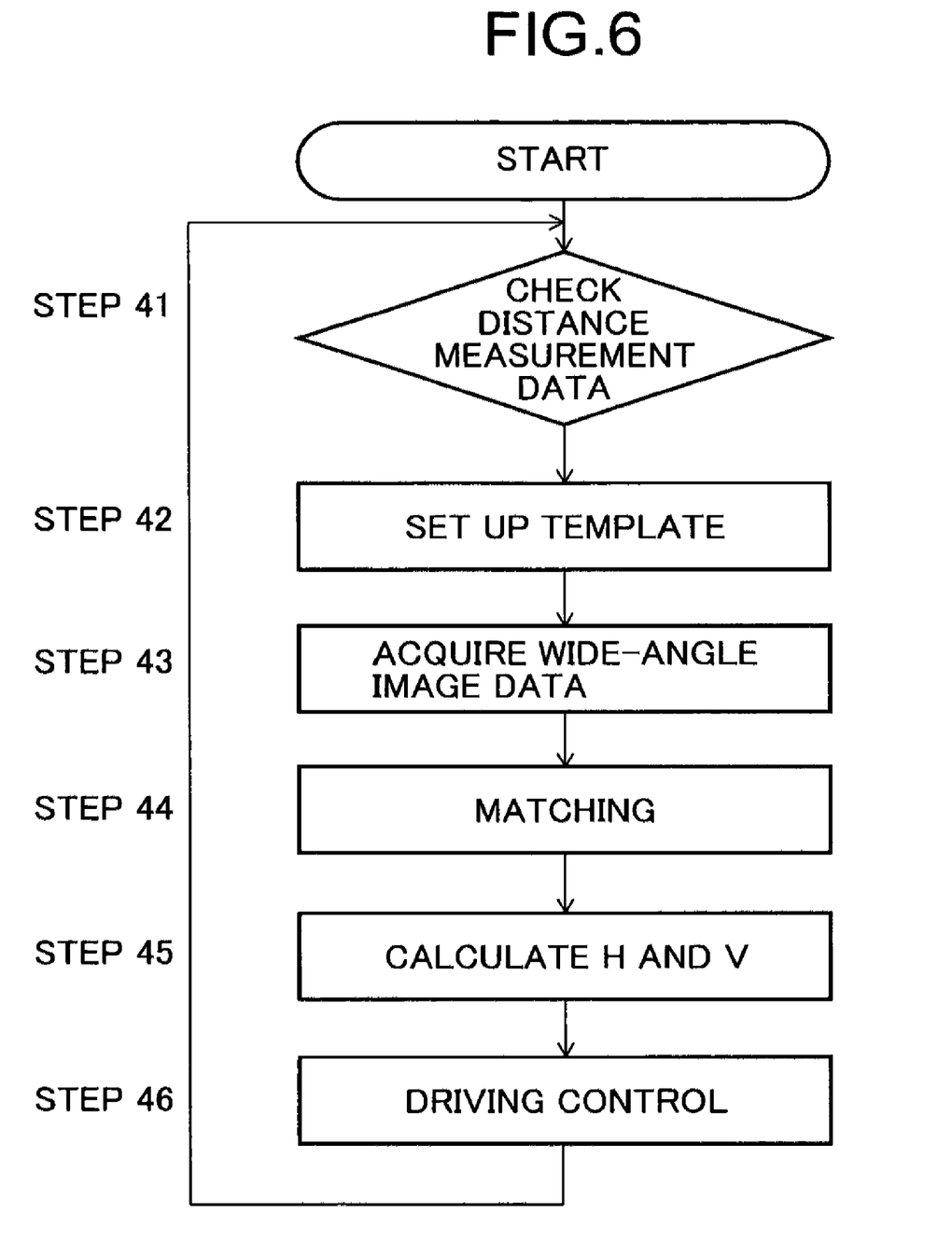
FIG. 6 is a flowchart of an image tracking in the embodiment of the present invention.

Next, referring to FIG. 6, description will be given on the image tracking.

When the tracking is started, the target is collimated by the first telescope 8, and the distance is measured (Step 41).

Based on the result of distance measurement, image pickup magnification to be used in the image tracking is set up. That is, it is selected whether the second image pickup unit 12 for wide angle is to be used or the third image pickup unit 13 for telescopic purpose is to be used. When the distance to be measured is short, the second image pickup unit 12 for wide angle is used. When the distance to be measured is long, the third image pickup unit 13 for telescopic purpose is used.

When the setting of magnification is completed, a still image in the collimating direction is taken. From the still image, an object is selected, and an object image 34 is extracted. Through the image processing of the object image 34, characteristic points 35 are extracted, and a template image 36 is set up so that a plurality of characteristic points are included (see FIG. 3) (Step 42).

The image tracking is started, and an image is acquired by the third image pickup unit 13, for instance (Step 43), and the image matching is performed between the acquired image and the template image 36. As the methods for the image matching, a normalized cross correlation method, a least square matching method, etc. in SSDA method (sequential similarity detection algorithm) are adopted. As described above, the template image 36 is in the size of 20×20 pixels. As a result, data processing at the matching can be quickly performed (at real time). Also, the accuracy of the matching is improved because many characteristic points are included (Step 44).

When the matching is completed, field angles (a horizontal angle (H) and a vertical angle (V)) of the central position of the template image 36 can be obtained on the image (Step 45).

The relation between the object image 34 and the template image 36 and a position of the target 31 in the object image 34 can be calculated from the image. When the central position of the template image 36 is determined, the collimating direction of the first telescope 8 can be determined or adjusted.

Based on the results of calculation on the horizontal angle and the vertical angle at the center of the template image 36, the driving of the horizontal drive unit 15 and the vertical drive unit 17 are controlled (Step 46).

Now, going back to Step 41, the data of distance measurement are checked. Because the size of the object varies according to the measured distance, it is checked whether the template image 36 is in a size suitable for the image matching or not. If it is judged to be the size not suitable for the image matching, the template image 36 should be updated.

The image matching based on the template image 36 and the updating of the template image 36 are repeated, and the image tracking is executed.

Referring to FIG. 4, description will be given now on the entire flow of the tracking operation.

When the tracking operation is initiated, the laser tracking and the image tracking are carried out in parallel (Step 01 and Step 21).

When both the laser tracking and the image tracking are carried out successfully, priority is given on the result of the laser tracking. Based on the results of the laser tracking, the surveying device 1 is controlled, and the horizontal drive unit 15 and the vertical drive unit 17 are driven (normal tracking). Distance measurement by the distance measuring unit 14 is continuously carried out.

When the image tracking is not successfully performed, it is judged that the template image 36 is not adequate. Then, magnification is adjusted according to the results of distance measurement by the distance measuring unit 14, and the template image 36 is set up again (Step 23). Under the condition where the reflection light from the target 31 is not detected, e.g. in case where the reflection light from the target 31 is intercepted or in case where two or more light spots are detected, a distance to the bulldozer 30 is measured by non-prism measurement.

Even when the image tracking is not successfully performed, if the laser tracking is successful, normal tracking is continuously executed (Step 03 and Step 10).

If the laser tracking is unsuccessful, but the image tracking is performed successfully, the surveying device 1 is driven according to the results of the image tracking, and the collimating direction is directed toward the target 31 (Step 10). When the image by the first image pickup unit 11 can be acquired and it is possible to perform the laser tracking, the laser tracking and the image tracking are carried out again in parallel. Based on the results of the laser tracking, the surveying device 1 is controlled, and distance measurement is carried out.

When both the laser tracking and the image tracking are unsuccessful, the tracking of the surveying device 1 is stopped, and a still image by the second image pickup unit 12 is acquired via the second telescope 9. Or, a still image is acquired by the third image pickup unit 13 via the first telescope 8 (Step 04). Whether the still image is acquired by the second image pickup unit 12 or the third image pickup unit 13 depends on the result of distance measurement immediately before the result is known when the tracking is found unsuccessful.

The image matching is performed on the acquired image. By the image matching, candidate points are extracted (Step 06). When there are two or more candidate points, an image is acquired by the first image pickup unit 11 on each of the candidate points, and it is judged whether a reflection light from the target 31 can be detected or not and whether the laser tracking can be performed or not (Step 07).

When it is judged that the laser tracking can be performed, the object determined by the image matching is considered as an object to be measured (object), and the target 31 can be detected (Step 08).

When the target 31 is detected, the laser tracking is started again.

When the target 31 cannot be detected on a plurality of candidate points, it is judged that searching is impossible to perform, and the driving of the surveying device 1 is stopped (Step 09).

In the embodiment as described above, the third image pickup unit 13 for acquiring an image of high magnification is provided on the first telescope 8 commonly used with the distance measurement optical system, while a magnification switchover mechanism may be disposed on the second telescope 9, and the second image pickup unit 12 and the third image pickup unit 13 may be arranged on the second telescope 9. In case where the distance to be measured is not changed extensively, one of the second image pickup unit 12 or the third image pickup unit 13, e.g. the second image pickup unit 12, may be omitted.

A light spot to emit light can be used as the target. In such case, a light emitter (a light source) to emit a light of a certain wavelength is provided on the moving object. By detecting the light from this light source by the image pickup units (one or all of the first, the second or the third image pickup units) in the present embodiment, the target can be tracked in a manner similar to the case of the laser tracking.

As a result, in the surveying device in the applied embodiment, the image matching by the template matching and the tracking of the target by detecting the light from the light source on a support member of the moving object by the image pickup unit are performed, and the same effects as in the embodiment as described above can be obtained.

Further, a variable power optical system may be provided on the second image pickup unit, and magnification may be varied according to the distance.

The invention claimed is:

1. A surveying device, comprising a first image pickup unit for projecting a laser beam and for receiving a reflection light from a target supported by a support member, a second image pickup unit for acquiring an image including the target and with a field angle wider than a field angle of the first image pickup unit, drive units for shifting collimating directions of the first image pickup unit and the second image pickup unit in a horizontal direction and in a vertical direction respectively, an image processing unit for processing images taken by the first image pickup unit and by the second image pickup unit, and a control arithmetic unit for controlling said drive units so that said first image pickup unit and said second image pickup unit are directed toward the target based on the image processing of the image taken by said first image pickup unit and on the image processing of the image taken by said second image pickup unit, wherein the image processing of the image by the first image pickup unit is a light spot detection processing to obtain a light spot from the target, wherein the image processing of the image by the second image pickup unit is an image matching with a template image as set up according to the image of said support member, and wherein the control arithmetic unit controls said drive units so that a tracking of the target is performed based on either the result of said light spot detection processing or the result of said image matching.

2. A surveying device, comprising a first image pickup unit for receiving a light from a light source, which is a target mounted on a support member, a second image pickup unit for acquiring an image including the target and with a field angle wider than a field angle of the first image pickup unit, drive units for shifting collimating directions of said first image pickup unit and said second image pickup unit in a horizontal direction and in a vertical direction respectively, an image processing unit for performing image processing of images picked up by the first image pickup unit and by said second image pickup unit, and a control arithmetic unit for controlling said drive units so that said first image pickup unit and said second image pickup unit are directed toward the target based on the image processing of the image taken by said first image pickup unit and on the image processing of the image taken by said second image pickup unit, wherein the image processing of the image by said first image pickup unit is a light spot detection processing to obtain a light spot from the target, wherein the image processing of the image by said second image pickup unit is an image matching with a template image as set up according to the image of said support member, and wherein said control arithmetic unit controls said drive unit so that a tracking of the target is performed based on either the result of one of said light spot detection processing or the result of said image matching.

3. A surveying device according to claim 1 or 2, wherein said control arithmetic unit controls a tracking based on a result of the light spot detection processing in case where the result of said light spot detection processing is obtained of the results of said light spot detection processing and said image matching.

4. A surveying device according to claim 1 or 2, wherein said control arithmetic unit controls a tracking based on a result of the image matching in case where the result of said light spot detection processing is not obtained and the result of said image matching is obtained of the results of said light spot detection processing and said image matching.

5. A surveying device according to claim 1 or 2, wherein said template image is a part of an object image as set up so that at least two or more characteristic points are included, wherein said object image of said support member is extracted from the image acquired by said second image pickup unit and further, said characteristic points are extracted from said object image.

6. A surveying device according to claim 5, wherein said template image is updated in response to the change of the measured distance.

7. A surveying device according to claim 1 or 2, wherein, in case where both results are not obtained from said light spot detection processing and from said image matching, said control arithmetic unit controls so that said drive units are stopped, a still image is acquired by the second image pickup unit, and an image matching is performed between said still image and said template image on the total range of said still image, and said control arithmetic unit obtains a position of the target from said still image based on the result of said image matching.

8. A surveying device according to claim 7, wherein said control arithmetic unit judges whether a light spot from the target can be obtained from candidate points in case where a plurality of candidates points are detected by said image matching, and judges whether a position where the light spot is obtained as the position of the target.

9. A surveying device according to claim 1 or 2, wherein said second image pickup unit can pickup an image of low magnification and an image of high magnification, and low magnification image pickup and high magnification image pickup can be selected, depending on the measured distance.

10. A surveying device according to claim 1 or 2, wherein said control arithmetic unit performs a tracking based on said image matching, detects said light spot of the target based on said image matching, and restores to the tracking operation based on the detection of a light spot.

11. An automatic tracking method, comprising a light spot detecting step for projecting a laser beam and for detecting a light spot from a target, a step for taking an image of a target and an image of a support member to support the target, and an image matching step for detecting said support member by image matching based on a template image as set up according to an image of said support member and the picked-up image, wherein said template image is a part of an object image as set up so that at least two or more characteristic points are included, wherein said object image of said support member is extracted from the image acquired by said second image pickup unit and further, said characteristic points are extracted from said object image and wherein said light spot detecting step, said step for taking said image of said target and said image of said support member to support the target, and said image matching step are carried out in parallel, and while a tracking is performed based on the result of detection of said light spot detecting step, a tracking operation is performed based on said image matching step in case where sufficient result is not obtained by detection in said light spot detecting step.

12. An automatic tracking method according to claim 11, wherein while a tracking is performed based on said image matching step, the target is detected according to said image matching, and it is restored the tracking operation based on light spot detection.

13. An automatic tracking method according to claim 11, wherein said light spot detecting step projects a laser beam and detects a reflection light from the target.

14. An automatic tracking method according to claim 11, wherein, in said light spot detecting step, said target is a light source, and a light emitted from said light source is detected.

15. A surveying device according to claim 5, wherein said second image pickup unit can pickup an image of low magnification and an image of high magnification, and low magnification image pickup and high magnification image pickup can be selected, depending on the measured distance.

* * * * *